(12) United States Patent
Heitz

(10) Patent No.: US 8,991,152 B2
(45) Date of Patent: Mar. 31, 2015

(54) AIRCRAFT ENGINE FUEL SYSTEM

(75) Inventor: Steven A. Heitz, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1075 days.

(21) Appl. No.: 13/012,471

(22) Filed: Jan. 24, 2011

(65) Prior Publication Data

US 2012/0186673 A1    Jul. 26, 2012

(51) Int. Cl.
     *F02K 3/00*      (2006.01)
     *F02C 7/22*      (2006.01)
     *F02C 7/236*      (2006.01)

(52) U.S. Cl.
     CPC . *F02C 7/22* (2013.01); *F02C 7/236* (2013.01); *F05D 2260/601* (2013.01); *F05D 2260/604* (2013.01)
     USPC .......................................... 60/243; 60/39.281

(58) Field of Classification Search
     CPC ............ F02C 9/26; F02C 9/263; F02C 7/236; F02C 7/22; F05D 2260/601; F05D 2260/604; F02M 37/0023; F02M 2700/4388
     USPC ........................ 60/39.281, 243, 734; 123/446; 137/565.15
See application file for complete search history.

(56) References Cited

U.S. PATENT DOCUMENTS

| | | | |
|---|---|---|---|
| 4,648,322 A | | 3/1987 | Heitz et al. |
| 5,103,632 A | | 4/1992 | Heitz et al. |
| 5,320,136 A | * | 6/1994 | Morris et al. ................. 137/528 |
| 5,896,737 A | * | 4/1999 | Dyer ............................... 60/773 |
| 5,941,786 A | | 8/1999 | Wijk et al. |
| 6,170,470 B1 | | 1/2001 | Clarkson et al. |
| 7,007,452 B1 | | 3/2006 | Baryshinokov et al. |
| 7,131,274 B2 | | 11/2006 | Baryshinokov et al. |
| 7,234,293 B2 | | 6/2007 | Yates et al. |
| 7,527,481 B2 | | 5/2009 | Baryshinokov et al. |
| 2005/0279079 A1 | | 12/2005 | Baryshinokov et al. |
| 2007/0017206 A1 | | 1/2007 | Baryshinokov et al. |

FOREIGN PATENT DOCUMENTS

| | | |
|---|---|---|
| EP | 0886054 A2 | 12/1998 |
| EP | 0886054 B1 | 1/2004 |
| EP | 2199612 A2 | 6/2010 |

* cited by examiner

*Primary Examiner* — Phutthiwat Wongwian
*Assistant Examiner* — Alain Chau
(74) *Attorney, Agent, or Firm* — Cantor Colburn LLP

(57) ABSTRACT

An aircraft fuel system is provided and includes a metering valve having inlet and outlet sides to monitor fuel flow from the inlet to the outlet side, a check valve that, when opened, allows fuel to flow toward the inlet side during start and climb conditions and, when closed, prevents such fuel flow and an ejector pump, which is operably disposed between the check valve and the metering valve, and which, with the check valve closed, pumps fuel toward the inlet side during idle conditions.

20 Claims, 3 Drawing Sheets

AIRCRAFT ENGINE FUEL SYSTEM

BACKGROUND OF THE INVENTION

The subject matter disclosed herein relates to an aircraft engine fuel system and, more particularly, to an aircraft engine fuel system including a pump unloading valve.

A conventional fuel supply system uses a positive displacement pump, for example a gear pump, which is driven by an engine through an accessory gearbox, to provide fuel through a fuel metering system to the burners of the engine. The positive displacement pump which, in the interests of clarity will be referred to herein as a "gear pump", receives fuel from a fuel supply and has a rotational speed directly proportional to the shaft speed of the engine. Generally, the capacity and therefore the size of the pump is calculated on the basis of the maximum fuel flow which will be needed in use and a safety margin is applied on top of that maximum. Thus, there will be many operating conditions, notably engine idle conditions where the output of the pump exceeds the demand of the engine.

Excess fuel from the pump output is spilled back to the low pressure side of the fuel system to maintain a substantially constant pressure drop across the fuel metering valve of the fuel metering system. A pressure raising and shut-off valve (PRSOV) is interposed between the metering valve and the engine burners, and ensures that the fuel system upstream of the PRSOV is pressurized to a sufficient level that ancillary equipment powered by fuel pressure, for example engine control vanes, can be operated. Additionally, the PRSOV provides a means of isolating the gas turbine engine burners from the fuel supply system when the engine is to be shut-off.

The conventional system described briefly above often suffers from "heat rejection". When the gear pump is pumping fuel against system pressure, the action of spilling fuel in excess of engine demand to the low pressure side of the system results in fuel heating. As fuel is used as a cooling medium for other engine system, the greater the level of rejection of heat into the fuel by the fuel pumps, the lower is the capacity of the fuel to cool other components. In addition, energy from the engine is wasted in heating the fuel through heat rejection at the fuel pumps thus resulting in an overall increase in engine fuel consumption.

BRIEF DESCRIPTION OF THE INVENTION

According to one aspect of the invention, an aircraft fuel system is provided and includes a metering valve having inlet and outlet sides to monitor fuel flow from the inlet to the outlet side, a check valve that, when opened, allows fuel to flow toward the inlet side during start and climb conditions and, when closed, prevents such fuel flow and an ejector pump, which is operably disposed between the check valve and the metering valve, and which, with the check valve closed, pumps fuel toward the inlet side during idle conditions.

According to another aspect of the invention, an aircraft engine fuel system is provided and includes a metering valve having inlet and outlet sides to monitor fuel flow from the inlet to the outlet side, main and auxiliary pumps to pump first and second fuel toward the inlet side, respectively, a pressure regulating valve operably disposed between the main pump and the inlet side to restrict the first fuel flow in accordance with a pressure differential between the outlet side and second fuel pressure and to force a portion of the first fuel into a bypass condition, a check valve, coupled to the pressure regulating valve, which, when closed restricts a flow of the bypassed portion of the first fuel toward the auxiliary pump and an ejector valve, operably disposed between the check valve and the auxiliary pump, which, when the check valve is closed, pumps second fuel from the pressure regulating valve toward the auxiliary pump.

According to yet another aspect of the invention, an aircraft engine fuel system is provided and includes a first valve to monitor fuel flow, first and second pumps to pump fuel toward the first valve, second and third valves to regulate an amount of fuel permitted to be pumped to the first valve and a third pump operably disposed between the third valve and the second pump to pump a portion of fuel toward the second pump, wherein, during start conditions, substantially all of the fuel pumped by the first and second pumps is permitted to be pumped to the first valve, during climb conditions, substantially all of the fuel pumped by the first pump is permitted to be pumped to the first valve and excess fuel pumped by the second pump is bypassed, and during idle conditions, substantially all of the fuel pumped by the second pump and excess fuel pumped by the first pump is bypassed.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The proposed pump unloading valve eliminates disturbances in the metered flow during the pump unloading sequence, which occur in similar systems in which the auxiliary pump is unloaded via a check valve to the low pressure fuel supply. In these cases, the ability of the additional fuel volume to be compressed causes an unacceptable disturbance in the metered flow and pressure. The proposed unloading valve, however, maintains a relatively constant pressurized fuel volume of fuel as the auxiliary pump is unloaded. This results in a more accurate control of delivered metered flow.

Figure 1:
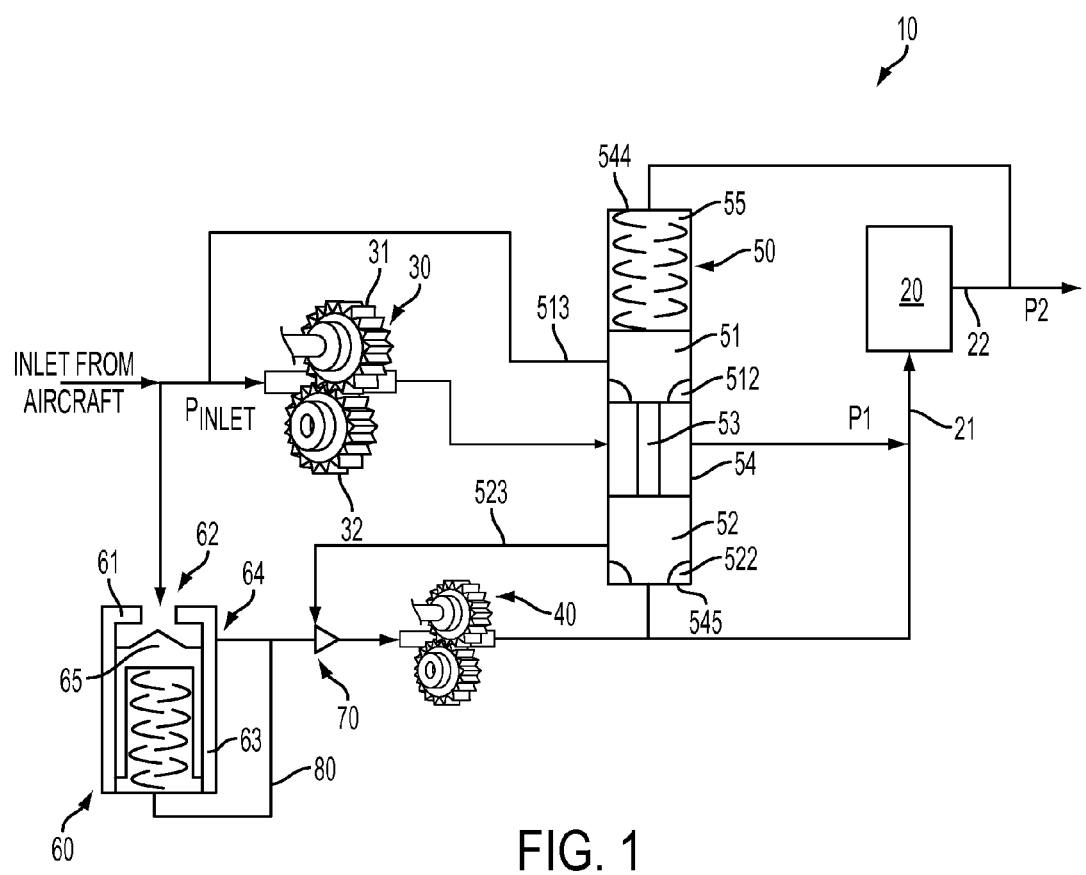
FIG. 1 is a schematic illustration of an aircraft engine fuel system during start conditions.
Figure 2:
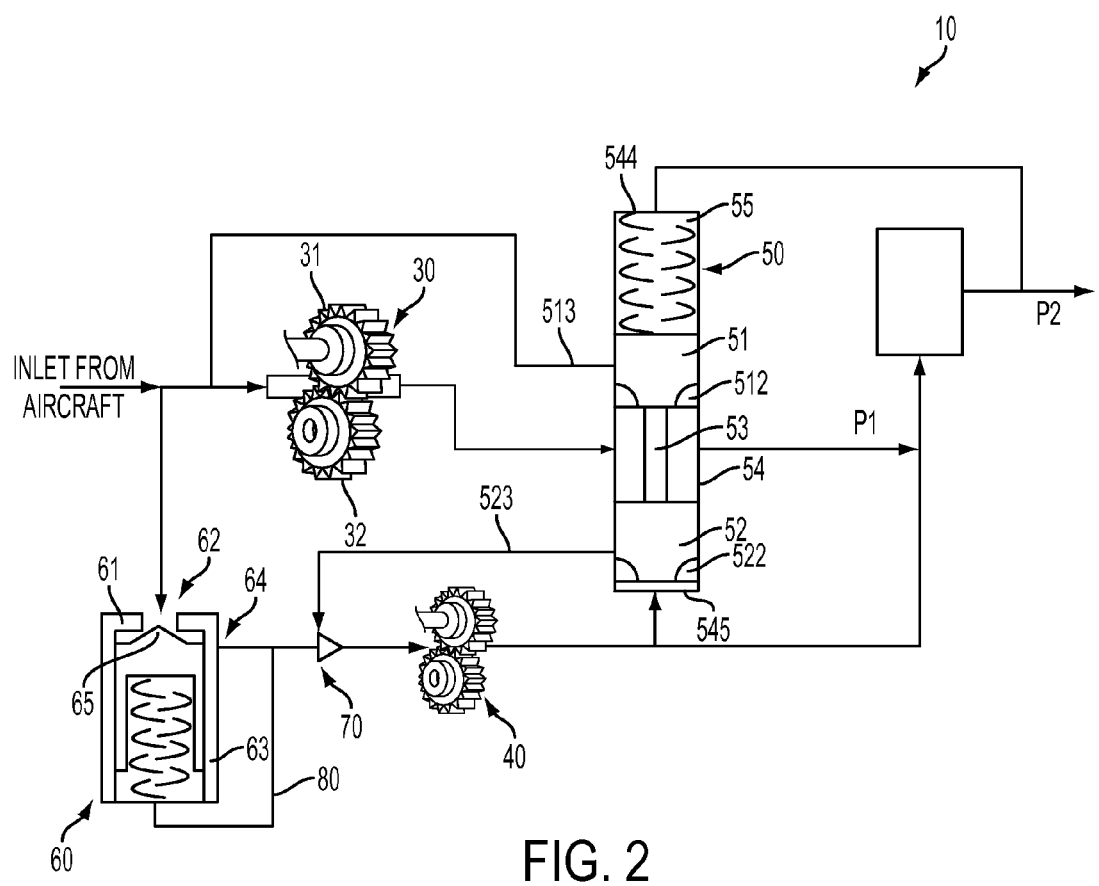
FIG. 2 is a schematic illustration of an aircraft engine fuel system during climb conditions.
Figure 3:
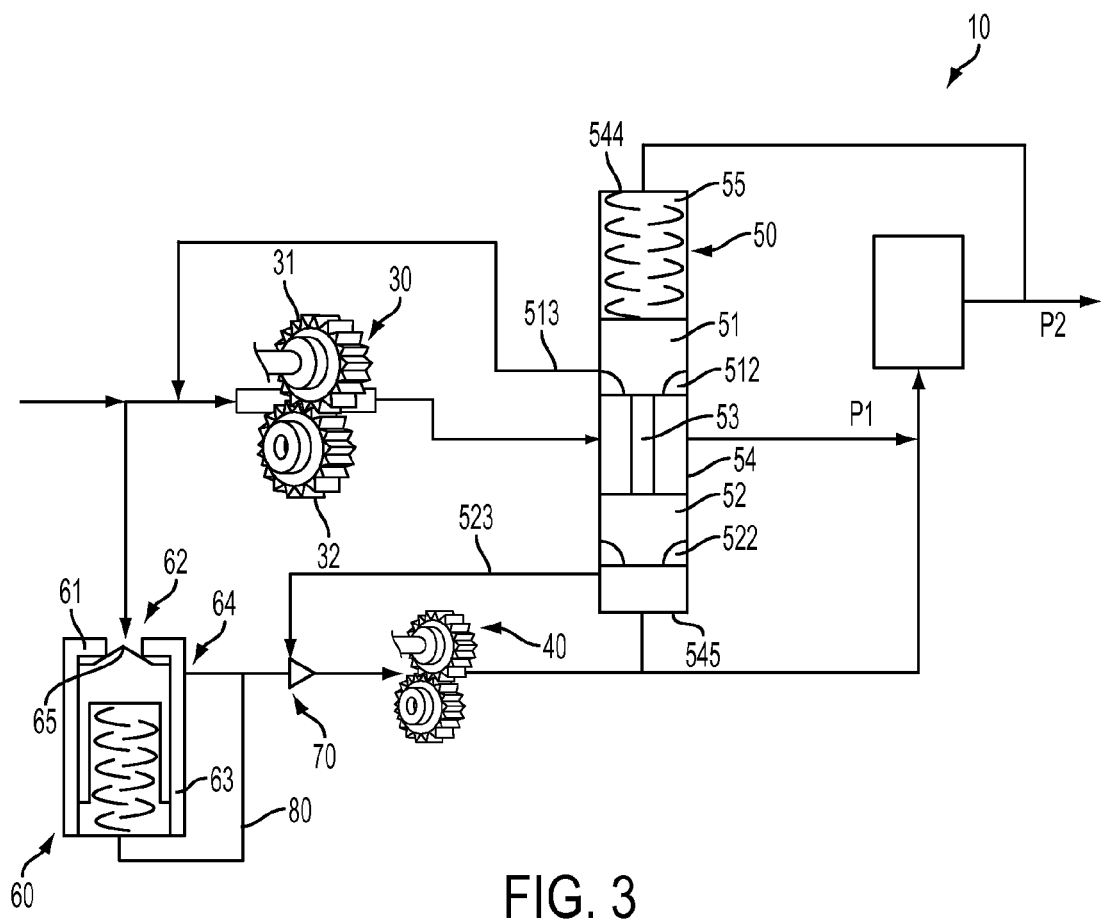
FIG. 3 is a schematic illustration of an aircraft engine fuel system during idle conditions.

With reference to FIGS. 1-3, an aircraft engine fuel system 10 is provided and includes a metering valve 20. The system 10 provides pump unloading and pressure regulation across the metering valve 20 from an inlet side 21 thereof at pressure P1 to an outlet side 22 thereof at pressure P2 while limiting fuel flow disturbances to metered fuel flow during pump unloading.

The system 10 further includes a main pump 30 and an auxiliary pump 40. The main pump 30 may include, for example, a gear pump with first and second opposing toothed gears 31, 32 that rotate in proximity to one another and in complementary directions to thereby draw in a supply of fuel from an aircraft fuel tank at an inlet pressure, Pinlet, and to output that fuel toward the inlet side 21 of the metering valve 20. The auxiliary pump 40 may include a gear pump similar to that of the main pump 30 or, alternatively, a balanced vane pump.

A pressure regulating valve 50 is operably disposed between the main pump 30 and the inlet side 21 and includes first and second grooved piston heads 51 and 52, which are connected to one another by a member 53. The first grooved piston head 51 is anchored to a first end 544 of the valve wall 54 by an elastic member 55 that biases the first and second grooved piston heads 51 and 52 toward a second end of the valve wall 54. In operation, space defined between the first grooved piston head 51 and the first end 544 of the valve wall 54 is fluidly coupled to the outlet end 22 whereas the space defined between the second grooved piston head 52 and the second end 545 of the valve wall 54 is fluidly coupled to the output of the auxiliary pump 40. Thus, movement of the first and second grooved piston heads 51 and 52 in opposition to the elastic member 55 is governed by a pressure differential between the pressure at the output side 22 and the pressure of the fuel pumped by the auxiliary pump 40.

During start flight conditions, such as those present during maximum thrust operations and engine startup, the pressure differential is defined in that the output side 22 pressure P2 is significantly larger than the pressure of the fuel pumped by the auxiliary pump 40 and, as such, the first and second grooved piston heads 51 and 52 are moved toward the second end 545 of the valve wall 54, as shown in FIG. 1. In this condition, substantially all of the fuel pumped by the main pump 30 is permitted to reach the inlet side 21. Similarly, since the space defined between the second grooved piston head 52 and the second end 545 of the valve wall 54 is small, substantially all of the fuel pumped by the auxiliary pump 40 is also permitted to reach the inlet side 21.

During climb flight conditions, when engine fuel demand remains substantial but is less than that of the start flight conditions, the metering valve 20 begins to decrease an amount of fuel provided to the outlet side 22. Thus, the pressure of the fuel pumped by the auxiliary pump 40 begins to exceed the force applied by the elastic member 55 and the outlet side 22 pressure P2 and, as such, the first and second grooved piston heads 51 and 52 begin to move toward the first end 544 of the valve wall 54, as shown in FIG. 2. In this condition, a groove 522 defined in the second grooved piston head 52 comes into fluid communication with bypass conduit 523 such that, while substantially all of the fuel pumped by the main pump 30 continues to be permitted to reach the inlet side 21, excess fuel pumped by the auxiliary pump 40 is bypassed.

During idle conditions, such as those present during ground idling and idle descent, engine fuel demand is decreased and the metering valve 20 correspondingly limits an amount of fuel provided to the outlet side 22. Thus, the pressure of the fuel pumped by the auxiliary pump 40 significantly exceeds that of the force applied by the elastic member 55 and the outlet side 22 pressure P2 and, as such, the first and second grooved piston heads 51 and 52 move toward and are positioned proximate to the first end 544 of the valve wall 54, as shown in FIG. 3. In this condition, a groove 512 defined in the first grooved piston head 51 comes into fluid communication with bypass conduit 513 such that excess fuel pumped by the main pump 30 is bypassed. In addition, since the groove 522 remains fluidly communicative with bypass conduit 523 and since the space defined between the second grooved piston head 52 and the second end 545 of the valve wall 54 is large, substantially all of the fuel pumped by the auxiliary pump 40 is bypassed.

The bypass conduit 513 and the fuel tank are both fluidly coupled to a check valve 60, which may include a first wall section 61 defining an inlet 62, a second wall section 63 defining an outlet 64 and a plunger 65 that moves between an open position, at which fluid communication between the inlet 62 and the outlet 64 is permitted, and a closed position, at which fluid communication is prevented. The bypass conduit 523 is fluidly coupled to an ejector pump 70. The ejector pump 70 is operably disposed between the check valve 60 and the auxiliary pump 40 and permits fuel flow from the check valve 60 to the auxiliary pump 40 during the start and climb flight conditions with the check valve 60 fully or partially open. By contrast, during the idle flight conditions, with the check valve closed, as shown in FIG. 3, the ejector pump 70 pumps bypassed fuel from the pressure regulating valve 50 to the auxiliary pump 40 while maintaining metered fuel pressure at pressure P2 during auxiliary pump unloading processes.

During start and climb flight conditions when fuel demand from the engine is substantial, the auxiliary pump 40 and the ejector pump 70 cooperatively prevent bypassed fuel from pressurizing feedback conduit 80 in excess of the pressure, Pinlet. As such, the pressure at the inlet 62 of the check valve 60 exceeds that of the pressure applied to the plunger 65 thus forcing the check valve 60 to fully or partially open. Fuel, therefore permitted to flow through the check valve 60, increases an amount of fuel reaching the inlet side 21 and increases an amount of fuel available for satisfying engine demands. During idle flight conditions, however, when engine fuel demand is decreased, pressurization of the feedback conduit 80 exceeds the pressure, Pinlet, which closes the check valve 60 and decreases the amount of fuel permitted to flow toward the inlet side 21.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft fuel system, comprising:
   a metering valve having inlet and outlet sides to control fuel flow from the inlet to the outlet side;
   a check valve that, when opened, allows fuel to flow toward the inlet side during start and climb conditions and, when closed, prevents such fuel flow;
   an ejector pump, which is operably disposed between the check valve and the metering valve, and which, with the check valve closed, pumps fuel toward the inlet side during idle conditions; and
   a pressure regulating valve (PRV) to restrict fuel flow from main and auxiliary pumps, which are disposed to pump fuel along separate fuel lines to the inlet side in accordance with a pressure differential between the outlet side and fuel pumped by the auxiliary pump, the PRV comprising:
   first and second connected piston heads elastically anchored to a first valve end and biased toward a second valve end, the second piston head having a groove that fluidly communicates with a conduit by which excess fuel pumped by the auxiliary pump is bypassed from the inlet side with the first and second piston heads moved toward the first valve end by a first distance from the second valve end, and the first piston head having a groove that fluidly communicates with a conduit by which excess fuel pumped by the main pump is bypassed from the inlet side with the first and second piston heads only moved toward the first valve end by a second distance from the second valve end, which is larger than the first distance.

2. The aircraft fuel system according to claim 1, wherein: the main pump pumps fuel toward the inlet side, and
the auxiliary pump is operably disposed downstream from the check valve and the ejector pump to pump fuel provided via the check valve or the ejector pump toward the inlet side.

3. The aircraft fuel system according to claim 2, wherein, during the start condition, substantially all of the fuel pumped by the main and the auxiliary pumps is permitted to be pumped to the inlet side.

4. The aircraft fuel system according to claim 2, wherein, during the climb condition, substantially all of the fuel pumped by the main pump is permitted to be pumped to the inlet side and excess fuel pumped by the auxiliary pump is bypassed by the PRV.

5. The aircraft fuel system according to claim 2, wherein during the idle conditions, substantially all of the fuel pumped by the auxiliary pump and excess fuel pumped by the main pump is bypassed by the PRV.

6. The aircraft fuel system according to claim 2, wherein, during the start and climb conditions, the PRV permits substantially all of the fuel pumped by the main pump to reach the inlet side.

7. The aircraft fuel system according to claim 6, wherein, during the idle conditions, the PRV directs excess fuel pumped by the main pump toward the check valve.

8. The aircraft fuel system according to claim 7, wherein, during the idle conditions, the PRV directs excess fuel pumped by the auxiliary pump toward the ejector pump.

9. An aircraft engine fuel system, comprising:
a metering valve having inlet and outlet sides to control fuel flow from the inlet to the outlet side;
main and auxiliary pumps to pump first and second fuel along separate fuel lines toward the inlet side, respectively;
a pressure regulating valve (PRV) operably disposed between the main pump and the inlet side to restrict the first fuel flow in accordance with a pressure differential between the outlet side and second fuel pressure and to force a portion of the first fuel into a bypass condition;
a check valve, coupled to the pressure regulating valve, which, when closed restricts a flow of the bypassed portion of the first fuel toward the auxiliary pump; and
an ejector pump, operably disposed between the check valve and the auxiliary pump,
which, when the check valve is closed, pumps second fuel from the pressure regulating valve toward the auxiliary pump,
wherein the PRV comprises:
first and second connected piston heads elastically anchored to a first valve end and biased toward a second valve end,
the second piston head having a groove that fluidly communicates with a conduit by which excess fuel pumped by the auxiliary pump is bypassed from the inlet side with the first and second piston heads moved toward the first valve end by a first distance from the second valve end, and the first piston head having a groove that fluidly communicates with a conduit by which excess fuel pumped by the main pump is bypassed from the inlet side with the first and second piston heads only moved toward the first valve end by a second distance from the second valve end, which is larger than the first distance.

10. The aircraft fuel system according to claim 9, wherein the check valve opens to allow the bypassed portion of the first fuel to flow toward the auxiliary pump during start and climb conditions and, when closed, prevents such first fuel flow.

11. The aircraft fuel system according to claim 10, wherein the ejector pump pumps fuel toward the inlet side during idle conditions with the check valve closed while maintaining metered fuel pressure during auxiliary pump unloading.

12. The aircraft fuel system according to claim 11, wherein, during the start condition, substantially all of the first and second fuel pumped by the main and the auxiliary pumps, respectively, is permitted to be pumped to the inlet side.

13. The aircraft fuel system according to claim 11, wherein, during the climb condition, substantially all of the first fuel pumped by the main pump is permitted to be pumped to the inlet side and excess second fuel pumped by the auxiliary pump is bypassed by the PRV.

14. The aircraft fuel system according to claim 11, wherein during the idle conditions, substantially all of the second fuel pumped by the auxiliary pump and excess first fuel pumped by the main pump is bypassed by the PRV.

15. The aircraft fuel system according to claim 11, wherein, during the start and climb conditions, the PRV permits substantially all of the first fuel pumped by the main pump to reach the inlet side.

16. The aircraft fuel system according to claim 15, wherein, during the idle conditions, the PRV directs excess first fuel pumped by the main pump toward the check valve.

17. The aircraft fuel system according to claim 16, wherein, during the idle conditions, the PRV directs excess second fuel pumped by the auxiliary pump toward the ejector pump.

18. An aircraft engine fuel system, comprising:
a first valve to control fuel flow;
first and second pumps to pump fuel toward the first valve;
second and third valves to regulate an amount of fuel permitted to be pumped to an inlet side of the first valve, the second valve comprising first and second connected piston heads elastically anchored to a first valve end and biased toward a second valve end, the second piston head having a groove that fluidly communicates with a conduit by which excess fuel pumped by the second pump is bypassed from the inlet side with the first and second piston heads moved toward the first valve end by a first distance from the second valve end, and the first piston head having a groove that fluidly communicates with a conduit by which excess fuel pumped by the first pump is bypassed from the inlet side with the first and second piston heads only moved toward the first valve end by a second distance from the second valve end, which is larger than the first distance; and
a third pump operably disposed between the third valve and the second pump to pump a portion of fuel toward the second pump, wherein the second valve is configured:
with the grooves non-communicative with the conduits during start conditions such that substantially all of the fuel pumped by the first and second pumps is permitted to be pumped to the first valve, with the groove of the second piston head fluidly communicative with the conduit by which excess fuel pumped by the second pump is bypassed from the inlet side during climb conditions such that substantially all of the fuel pumped by the first pump is permitted to be pumped to the first valve and excess fuel pumped by the second pump is bypassed between a valve wall and the second piston head to the third pump, and with the groove of the first piston head fluidly communicative with the conduit by which excess fuel pumped by the first pump is bypassed from the inlet side during idle conditions such that substantially all of the fuel pumped by the second pump is bypassed between the valve wall and the second piston head to the third pump and excess fuel pumped by the first pump is bypassed between the valve wall and the first grooved piston head to the first pump.

19. The aircraft engine fuel system according to claim 18, wherein the third valve opens during the start and climb conditions and the excess fuel pumped by the second pump is bypassed toward the third pump.

20. The aircraft engine fuel system according to claim 19, wherein the third valve closes during the idle conditions and the third pump is activated to pump the excess fuel pumped by the second pump toward the second pump.

\* \* \* \* \*